(12) United States Patent
Ma et al.

(10) Patent No.: US 7,813,261 B2
(45) Date of Patent: Oct. 12, 2010

(54) METHODS AND SYSTEMS FOR TRANSMISSION OF ORTHOGONAL FREQUENCY DIVISION MULTIPLEXED SYMBOLS

(75) Inventors: Jianglei Ma, Kanata (CA); Hang Zhang, Nepean (CA); Wen Tong, Ottawa (CA); Peiying Zhu, Kanata (CA); Ming Jia, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 342 days.

(21) Appl. No.: 11/887,115

(22) PCT Filed: Mar. 30, 2006

(86) PCT No.: PCT/CA2006/000465

§ 371 (c)(1),
(2), (4) Date: Sep. 25, 2007

(87) PCT Pub. No.: WO2006/102746

PCT Pub. Date: Oct. 5, 2006

(65) Prior Publication Data

US 2009/0028258 A1    Jan. 29, 2009

Related U.S. Application Data

(60) Provisional application No. 60/666,548, filed on Mar. 30, 2005, provisional application No. 60/674,904, filed on Apr. 26, 2005.

(51) Int. Cl.
*H04J 11/00* (2006.01)
*H04J 3/26* (2006.01)
*H04H 20/71* (2008.01)
*H04L 23/02* (2006.01)

(52) U.S. Cl. ............... 370/203; 370/208; 370/312; 370/432; 375/260

(58) Field of Classification Search .......... 370/203–211, 370/312, 390, 392–393, 470–477, 535; 375/259–260; 455/450, 59–61, 500, 103
See application file for complete search history.

(56) References Cited

U.S. PATENT DOCUMENTS

| 2005/0135291 A1 | 6/2005 | Ketchum et al. |
| 2006/0009200 A1 | 1/2006 | Jung et al. |
| 2006/0176966 A1* | 8/2006 | Stewart et al. ............... 375/260 |
| 2006/0285483 A1* | 12/2006 | Khan ........................ 370/208 |
| 2007/0058595 A1* | 3/2007 | Classon et al. .............. 370/337 |

(Continued)

FOREIGN PATENT DOCUMENTS

CA          2537534          3/2005

*Primary Examiner*—Tri H Phan

(57) ABSTRACT

In some embodiments of the present invention there is provided a frame structure for transmitting an integer number of OFDM symbols in which some of the OFDM symbols are to be transmitted in a unicast format and some of the OFDM symbols are to be transmitted in a broadcast format. The frame structure includes partitioning of a frame into at least two portions to accommodate both unicast and broadcast modes in the frame. The frame structure is used for transmitting multiple frames in a serial manner from at least one transmitter. The unicast mode supports transmission of OFDM symbols from a single transmitter to a single receiver. The broadcast mode supports transmission of OFDM symbols from multiple transmitters to all receivers within range of the multiple transmitters. The multicast mode supports transmission of OFDM symbols from multiple transmitters to multiple receivers within range of the multiple transmitters.

18 Claims, 14 Drawing Sheets

U.S. PATENT DOCUMENTS

| | | |
|---|---|---|
| 2007/0064669 A1* | 3/2007 | Classon et al. .............. 370/347 |
| 2007/0104151 A1* | 5/2007 | Papasakellariou et al. ... 370/335 |
| 2007/0189289 A1* | 8/2007 | Frederiksen et al. ........ 370/390 |
| 2008/0175264 A1* | 7/2008 | Qu et al. ..................... 370/436 |
| 2009/0316614 A1* | 12/2009 | Kim et al. ................... 370/312 |

* cited by examiner

METHODS AND SYSTEMS FOR TRANSMISSION OF ORTHOGONAL FREQUENCY DIVISION MULTIPLEXED SYMBOLS

RELATED APPLICATIONS

This application claims the benefit of U.S. Provisional Patent Application No. 60/666,548 filed on Mar. 30, 2005 and U.S. Provisional Patent Application No. 60/674,904 filed on Apr. 26, 2005, which are each hereby incorporated in their entirety.

FIELD OF THE INVENTION

The invention relates to the field of wireless communications, more specifically to systems and methods for supporting unicast and multicast OFDM transmission.

BACKGROUND OF THE INVENTION

Orthogonal frequency division multiplexing (OFDM) is a form of multiplexing that distributes data over a number of carriers that have a very precise spacing in the frequency domain. The precise spacing of the carriers provides several benefits such as high spectral efficiency, resiliency to radio frequency interference and lower multi-path distortion. Due to its beneficial properties and superior performance in multi-path fading wireless channels, OFDM has been identified as a useful technique in the area of high data-rate wireless communication, for example wireless metropolitan area networks (MAN). Wireless MAN are networks to be implemented over an air interface for fixed, portable, and mobile broadband access systems.

Different types of the data transmissions can be transmitted by the wireless network using an OFDM air interface, for example unicast transmissions, multicast transmissions and broadcast transmissions. The different types of transmissions result in transmission frames of different sizes due to different sized guard intervals between OFDM symbols in the frames.

SUMMARY OF THE INVENTION

According to a first broad aspect of the invention, there is provided a method comprising: arranging in a frame a plurality of OFDM symbols to support OFDM symbol transmission from a single transmitter in a unicast mode portion of the frame and a broadcast mode portion of the frame; transmitting the frame in a sequence of frames in which each frame has a same frame duration.

In some embodiments the method further comprises synchronizing transmission by at least two of a plurality of transmitters for each frame in the sequence of frames such that the at least two transmitters partition between unicast mode and broadcast mode synchronously.

In some embodiments arranging OFDM symbols in the frame comprises: dividing the frame into a plurality of equal duration portions; and partitioning the frame into the unicast mode portion and the broadcast mode portion to coincide with a boundary that divides the frame into the plurality of equal duration portions.

In some embodiments dividing the frame into a plurality of equal duration portions comprises dividing the frame into five equal duration portions.

In some embodiments OFDM symbols in the broadcast mode portion of the frame comprise a longer guard interval than OFDM symbols in the unicast mode portion.

In some embodiments arranging in a frame a plurality of OFDM symbols comprises employing a common sampling frequency and a common FFT size for OFDM symbols transmitted using both unicast mode and broadcast mode.

In some embodiments the method further comprises defining a plurality of frame structures each including a particular unicast mode portion and broadcast mode portion, and transmitting a frame structure identifier that identifies which frame structure is being used.

In some embodiments the method further comprises: using the broadcast mode portion of the frame for transmitting unicast mode OFDM symbols from the transmitter, wherein a duration of the broadcast mode portion is maintained as if broadcast mode OFDM symbols were being transmitted.

In some embodiments the method further comprises: for broadcast mode in a single cell, using the unicast mode portion of the frame for transmitting broadcast mode OFDM symbols from the transmitter, wherein a duration of the unicast mode portion maintained as if unicast mode OFDM symbols were being transmitted.

In some embodiments the sequence of frames further comprises at least one of: frames that are for unicast mode transmissions only; and frames that are for broadcast mode transmissions only.

In some embodiments the method further comprises: dividing each frame into a plurality of subframes; logically subdividing each subframe into a plurality of slots; partitioning each frame between unicast mode and broadcast mode along a slot boundary.

In some embodiments the method further comprises: dividing each frame into a plurality of subframes; logically subdividing each subframe into a plurality of slots; within a subset of subframes of the plurality of subframes, partitioning between unicast mode and broadcast mode along an OFDM symbol boundary, and using each remaining subframe in its entirety for one of unicast mode or broadcast more.

According to a second broad aspect of the invention, there is provided a method for receiving a frame comprising a plurality of OFDM symbols, the method comprising: accessing a communication network sending the frame; receiving information from which a frame structure can be determined; receiving a plurality of OFDM symbols according to the frame structure, wherein the frame structure comprises a unicast mode portion and a broadcast mode portion.

In some embodiments receiving information comprises determining a location of a broadcast control channel within the plurality of OFDM symbols and extracting from the broadcast control channel information from which the frame structure can be determined.

According to a third broad aspect of the invention, there is provided a communication network comprising: a plurality of telecommunication cells each comprising at least one transmitter and divided into at least two portions; at least one sub-network comprised of portions of at least two adjacent telecommunication cells of the plurality of telecommunication cells, the at least one sub-network being supported by one of: a transmitter of one of the at least two adjacent telecommunication cells for unicast mode transmissions, a transmitter of one of the at least two adjacent telecommunication cells for single-cell broadcast mode transmissions and transmitters of all of the at least two adjacent telecommunication cells for broadcast transmissions, wherein the transmitters of the at least one sub-network are adapted to transmit OFDM symbols in both unicast mode and broadcast mode in a same transmission frame structure.

In some embodiments when there is more than one sub-network, at least one of the sub-networks transmitting different content than the other sub-networks.

In some embodiments when there is more than one sub-network, the sub-networks transmitting the same content.

In some embodiments each sub-network mitigates interference from propagation delay of the same content transmitted by adjacent sub-networks by using at least one of: different scrambling codes and different sub-channel arrangements for transmission.

In some embodiments the frame structure used for all transmitters transmitting in a particular sub-network is the same for each respective frame transmitted at the same time by all the transmitters.

In some embodiments transmission of each frame by each of the transmitters of the at least one sub-network is synchronized to occur simultaneously.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

In some embodiments of the present invention there is provided a frame structure for transmitting an integer number of OFDM symbols in which partitioning of a frame is employed for transmission of OFDM symbols in both unicast and broadcast modes in the same frame. In some embodiments the frame structure is used for down link communication from a basestation to mobile terminals within the range of the basestation. The frame structure is used for transmitting multiple frames in a serial manner from at least one transmitter, such as a basestation (BS). The unicast mode supports transmission of OFDM symbols from a single transmitter to a single receiver occurring in a single cell. The broadcast mode supports transmission of OFDM symbols from multiple transmitters each in a respective cell to all receivers within range of the respective cells. The broadcast mode also supports transmission of OFDM symbols from multiple transmitters to multiple receivers within range of the multiple transmitters. The broadcast mode also supports transmission of OFDM symbols from a transmitter in a single cell to multiple receivers within the cell.

Figure 6:
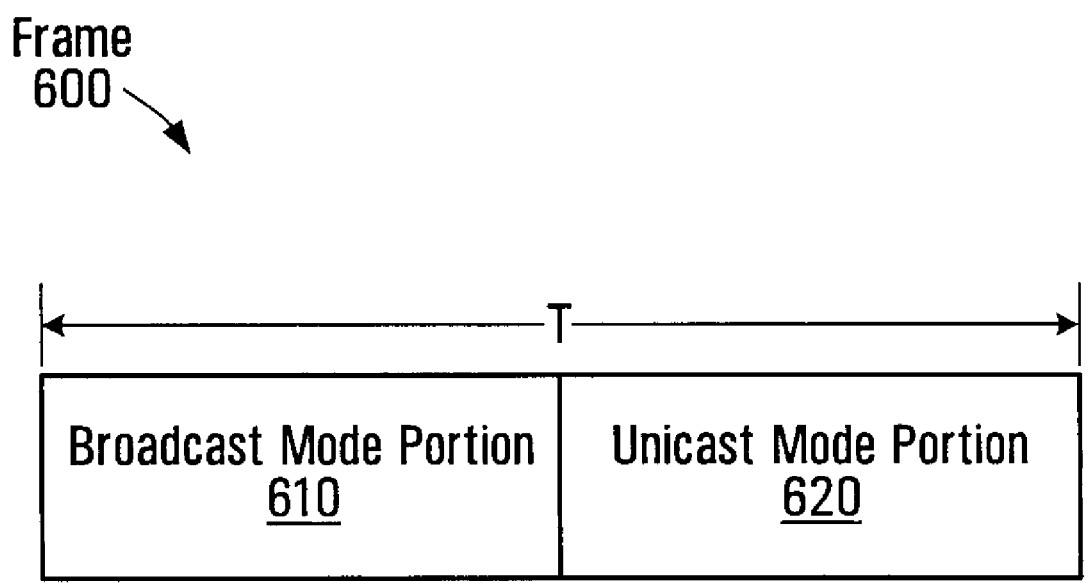
FIG. 6 is a schematic diagram of a frame structure for combined unicast mode and broadcast mode transmission of OFDM symbols according to an embodiment of the invention.

FIG. 6 shows a schematic diagram of a frame 600 during which multiple OFDM symbols are transmitted during time T and in which a first portion 610 of the frame 600 is used for transmission of OFDM symbols in a broadcast mode portion and a Second portion 620 of the frame 600 is used for transmission of OFDM symbols in a unicast mode portion.

In some embodiments the partitioning of frames into the broadcast mode portion 610 and the unicast mode portion 620 is done in substantially the same manner for each frame of a sequential series of frames transmitted by a transmitter. In some embodiments the same partitioning is applied to multiple transmitters. For example, a first plurality of OFDM symbols in a frame may be dedicated to broadcast mode and a remaining number of OFDM symbols that fill the frame are dedicated to the unicast mode. Conversely, a first plurality of OFDM symbols in a frame may be dedicated to unicast transmission mode and a remaining number of OFDM symbols that fill the frame are dedicated to broadcast transmission mode.

In some embodiments, the frame is divided into multiple portions or subframes, each having an equal duration. In some implementations the subframes are referred to as transmission time intervals (TTI). For example, a frame having a duration equal to 10 ms may include five subframes, which are each 2 ms in duration. More generally, the number of subframes in a frame is implementation specific. In some embodiments the number of subframes in the frame and their respective durations are dynamically configurable. Once the number and duration of subframes is set in the frame the respective durations of the subframes remain the same until they are reconfigured.

In OFDM systems, a guard interval is often used to reduce inter-symbol interference (ISI) between consecutive OFDM symbols. In some embodiments the guard interval includes a cyclic prefix, which is a replication of a particular number of samples of an end portion of data payload in the OFDM symbol. The cyclic prefix is transmitted during the guard interval between sequentially transmitted OFDM symbols.

Transmission of the frame from the BS to a mobile terminal along multiple paths causes each OFDM symbol in the frame and delayed replicas of each OFDM symbol to arrive at the mobile terminal with a delay spread. The respective cyclic prefix of each OFDM symbol and OFDM symbol replicas enables each OFDM symbol to be realigned, which maintains the orthogonality of the OFDM symbols.

In some embodiments, the cyclic prefix, or more generally the guard time used in broadcast mode transmission of an OFDM symbol has a greater number of samples than for unicast mode transmission of an OFDM symbol. This is because there is potentially more multipath delay and/or propagation delay of the broadcast OFDM symbols when the mobile terminal is receiving OFDM symbols from multiple BSs located in multiple cells than from a single BS located in a single cell. In some embodiments the cyclic prefix, or more generally the guard time, used in broadcast mode transmission of an OFDM symbol has a same number of samples as for unicast mode transmission of an OFDM symbol. For example, for single cell broadcast, there is no need to have a longer guard time as there are no propagation delays to avoid. In some embodiments the data payload for both the unicast and broadcast modes of OFDM symbols is the same duration. In some implementations OFDM symbols have the same duration, which is determined by sampling rate and FFT size regardless of the content transmitted by this symbol. Therefore, if the cyclic prefix varies in size between the two modes, an overall length of respective OFDM symbols of the two modes differs by an amount equal to the difference in length between the respective cyclic prefixes.

In some embodiments OFDM symbols of a same mode type, either unicast mode or broadcast mode have a different duration. For example, two OFDM symbols both being transmitted by unicast mode may have a same FFT size, but the guard time may vary by a particular number of samples. This difference in OFDM symbol duration may be due in some implementations to utilize the full duration of the frame.

Selecting the length of the cyclic prefix for use in the broadcast mode is a trade-off between transmission performance and the spectrum efficiency. The longer the cyclic prefix, which is a component of signal overhead, the less data that can be transmitted during a fixed frame duration. An example of a frame duration for a transmission bandwidth of 10 MHz is 10 ms. However, it is to be understood that the frame duration may be greater than or less than 10 ms and that the bandwidth may be greater than or less than 10 MHz.

In frames that include only a single mode, be that broadcast mode or unicast mode, all of the OFDM symbols are of a constant duration for the entire frame as the guard time of each OFDM symbol is equal.

In some embodiments, when transmitting frames that include OFDM symbols in both broadcast mode and unicast mode, partitioning of the broadcast mode portion and the unicast mode portion is performed to ensure that: the overall frame duration is maintained; the frame includes an integer number of OFDM symbols; and the partitions are synchronized for broadcast and unicast modes for corresponding transmission by more than one transmitter such as a BS in a multi-cell broadcast scenario. In some embodiments synchronization of partitions may be accomplished by using external timing information accessible by the transmitter such as from a satellite global positioning system (GPS). In some embodiments synchronization of partitions may be accomplished by using a synchronization channel in an initial portion of the frame.

In some embodiments of the invention sequences of frames are sent out by a BS that include:

frames that are unicast only;
frames that are broadcast only; and
frames that include both unicast and broadcast.

Figure 7:
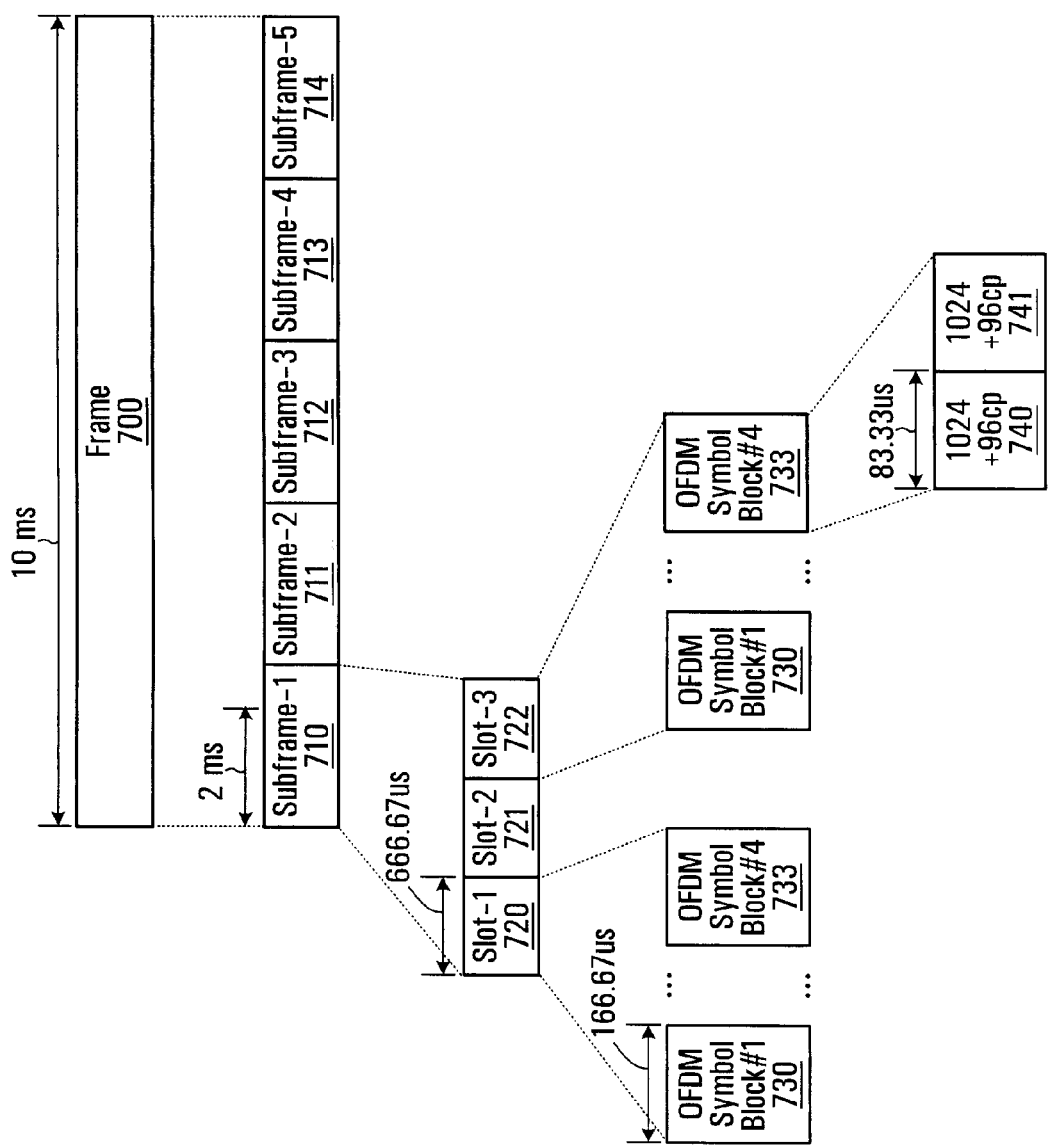
FIG. 7 is a schematic diagram of a frame structure for unicast mode transmission of OFDM symbols.
Figure 8:
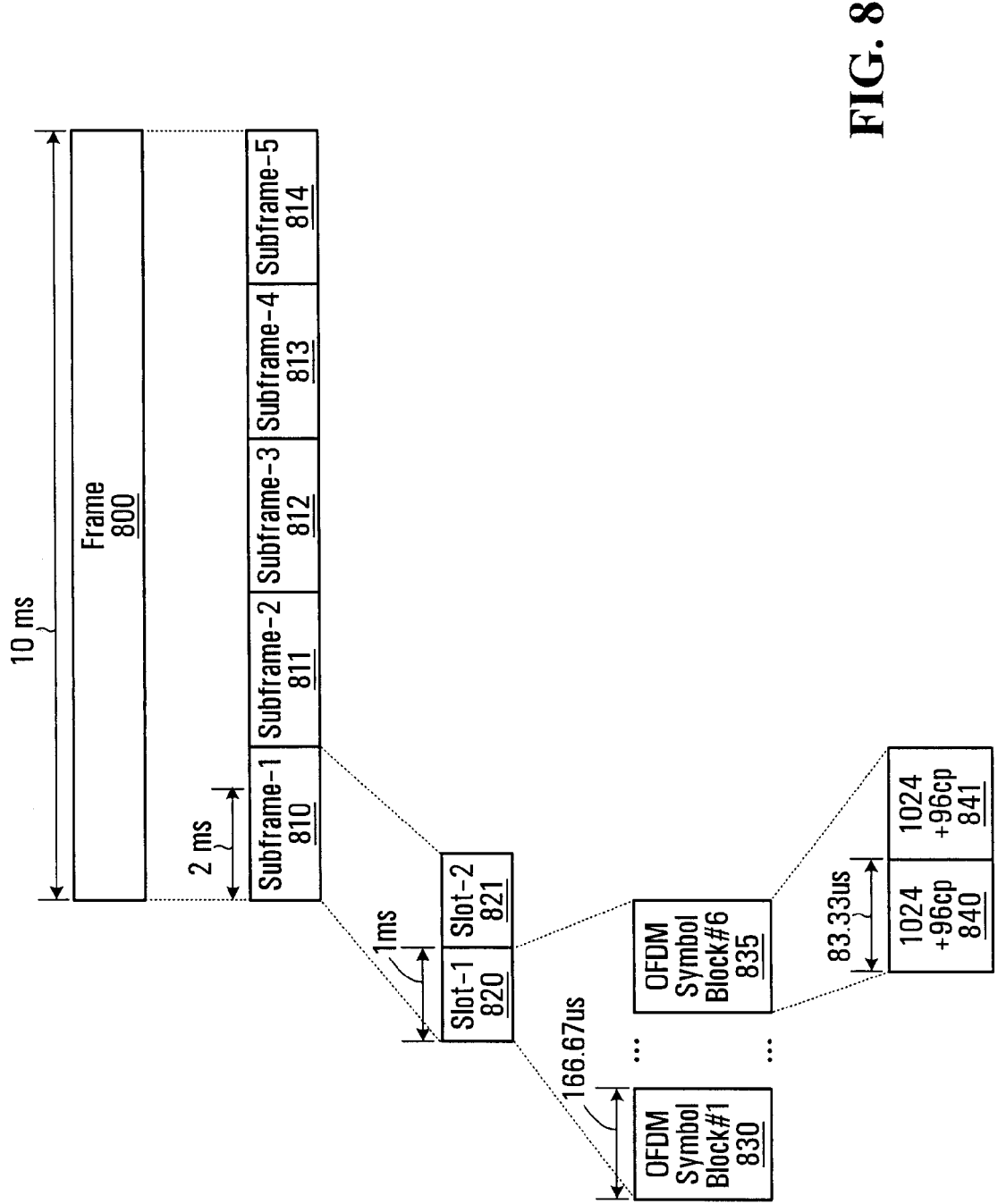
FIG. 8 is a schematic diagram of another frame structure for unicast mode transmission of OFDM symbols.
Figure 9:
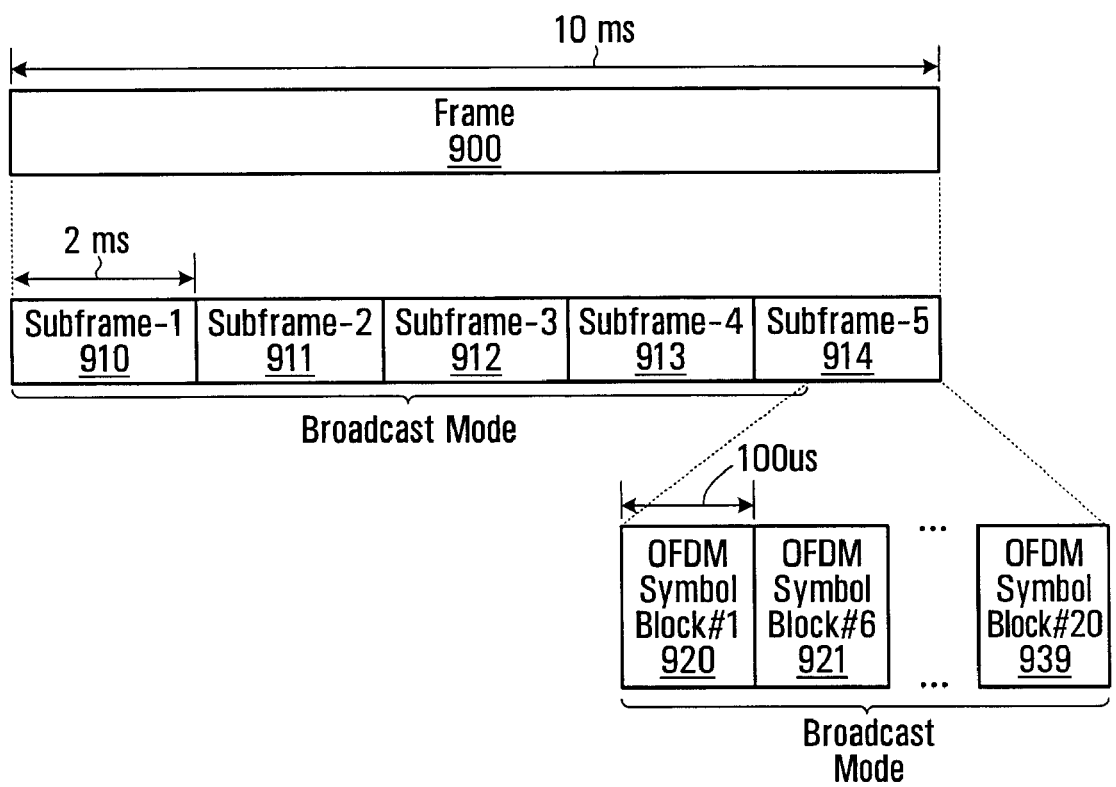
FIG. 9 is a schematic diagram of a frame structure for broadcast mode transmission of OFDM symbols.

In other embodiments, every frame that is sent out by a transmitter includes both unicast mode and broadcast mode transmissions. FIGS. 7 and 8 are examples of frames in which all OFDM symbols are transmitted in unicast mode. FIG. 9 is an example of a frame in which all OFDM symbols are transmitted in broadcast mode. FIGS. 10 to 14 are examples of frames in that include both unicast mode and broadcast mode.

An example of a frame structure supporting a unicast transmission mode for OFDM symbols is shown in FIG. 7. The frame 700 is shown to be 10 ms in duration. There are five subframes 710,711,712,713,714 in the frame 700, in which each subframe is 2 ms in duration. Each subframe is divided into three slots 720,721,722, in which each slot has a duration of 666.67 µs. The slots each include four OFDM Symbol Blocks 730-733 that have a duration of 166.67 µs. The OFDM Symbol Blocks 730-733 each contain two OFDM symbols 740,741 that have a duration of 83.33 µs. Each OFDM symbol includes a cyclic prefix of 96 samples and a data payload including a 1024 sample FFT. Each subframe includes 24 OFDM symbols and therefore the frame includes a total of 120 OFDM symbols. It is to be understood that the duration of the cyclic prefix and the data payload are not limited to these particular values, but are variable based or desired implementation.

Another example of a frame structure supporting a unicast transmission mode for OFDM symbols is shown in FIG. 8. The frame 800 is 10 ms in duration. Similar to FIG. 7, there are five subframes 810,811,812,813,814 in the frame 800, in which each subframe is 2 ms in duration. Each subframe is divided into two slots 820,821, each slot being 1 ms in duration. The slots 820,821 each include six OFDM Symbol Blocks 830-835 that are 166.67 µs in duration. The OFDM Symbol Blocks 830-835 each contain two OFDM symbols 840,841 that have a duration of 83.33 µs. Each OFDM symbol has the same duration for the cyclic prefix and data payload and as the OFDM symbol in FIG. 7, but it is to be understood that these values are variable based in desired implementation. Each subframe includes 24 OFDM symbols and the frame includes a total of 120 OFDM symbols.

An example of a frame structure supporting broadcast mode for transmission of OFDM symbols is shown in FIG. 9. A frame 900 is shown to be 10 ms in duration. There are five subframes 910,911,912,913,914 in the frame 900 and each subframe is 2 ms in duration. Each subframe is divided into twenty OFDM Symbol Blocks 920-939, where each OFDM symbol Block includes two OFDM symbols (not shown). Each OFDM symbol includes a cyclic prefix of 320 samples and a data payload including a 1024 sample FFT. The frame includes a total of 100 OFDM symbols. In the example of FIG. 9 there is no reference to the subframes being divided into slots, the subframes are segmented into the twenty OFDM Symbol Blocks.

In some embodiments the OFDM symbols in the frame structure have a common sampling frequency and a common FFT size for both unicast mode and broadcast mode.

The trade-off between performance and the spectrum efficiency is seen in FIGS. 7, 8 and 9. FIGS. 7 and 8 have OFDM symbols for unicast transmission each with a cyclic prefix of 96 samples and each of the respective frames include a total of 120 OFDM symbols, whereas FIG. 9 has OFDM symbols for broadcast transmission each with a cyclic prefix of 320 samples and the frame includes a total of 100 OFDM symbols. The unicast mode has less overhead as compared to the broadcast mode and consequently more payload room for signal transmission. In some embodiments, there is a difference in the duration of the OFDM symbols in the unicast mode portion and the broadcast portion is due at least in part to the difference in size of the cyclic prefix of the two transmission modes. The smaller cyclic prefix for unicast mode transmission enables more payload to be transmitted than for broadcast mode transmission.

Table 1 below includes an example of OFDM symbol parameters for a 10 MHz transmission bandwidth frame for unicast mode transmission where the number of cyclic prefix samples is 96.

TABLE 1

| Parameter | Value |
|---|---|
| IFFT/FFT Block | 1024 |
| Sampling Rate | 13.44 MHz (=7/2*3.84 MHz) |
| No. of Cyclic Prefix Samples | 96 |
| Guard Time | 7.14 us |
| No. of Samples per Symbol | 1120 |
| Useful Symbol Duration | 76.19 us |
| Total OFDM Symbol Duration | 83.33 us |
| Sub-carrier Separation | 13.125 KHz |
| No. of useful sub-carriers ($N_{used}$) | 704* |
| The index of the first useful sub-carrier ($K_{min}$) | 160 |
| The index of the last useful sub-carrier ($K_{max}$) | 864 |
| Bandwidth | 9.24 MHz |

*DC sub-carrier (1024th sub-carrier is not used)

The example parameter values of the OFDM symbol parameters in Table 1 for a 10 MHz transmission bandwidth frame are not meant to limit the invention. The parameter values are implementation specific. In some embodiments the OFDM symbol parameter values vary depending on desired sampling rate, member of cyclic prefix samples (overall guard time) and the FFT size.

Notwithstanding that the OFDM parameters shown above are for a 10 MHz transmission bandwidth, in some implementations, the parameters are scalable up to 20 MHz and down to 1.25 MHz. In some embodiments the parameters are not scaled with respect to the above parameters for other transmission bandwidths, but are different values all together for each respective parameter for different transmission bandwidths.

In some embodiments, parameters for an OFDM symbol for a 10 MHz transmission bandwidth frame for broadcast mode transmissions are similar to Table 1 above, but the associated values are different. For example the "No. of Cyclic Prefix Samples" may be larger than 96 for broadcast mode transmissions. Consequently, a longer prefix also changes the "No. of Samples per Symbol" and other parameters that identify particular durations and indices of sub-carriers.

FIGS. 10-14 show particular examples of frame structures that support both unicast mode and broadcast mode transmission of OFDM symbols.

Partitioning Along Subframe Boundaries

Figure 10:
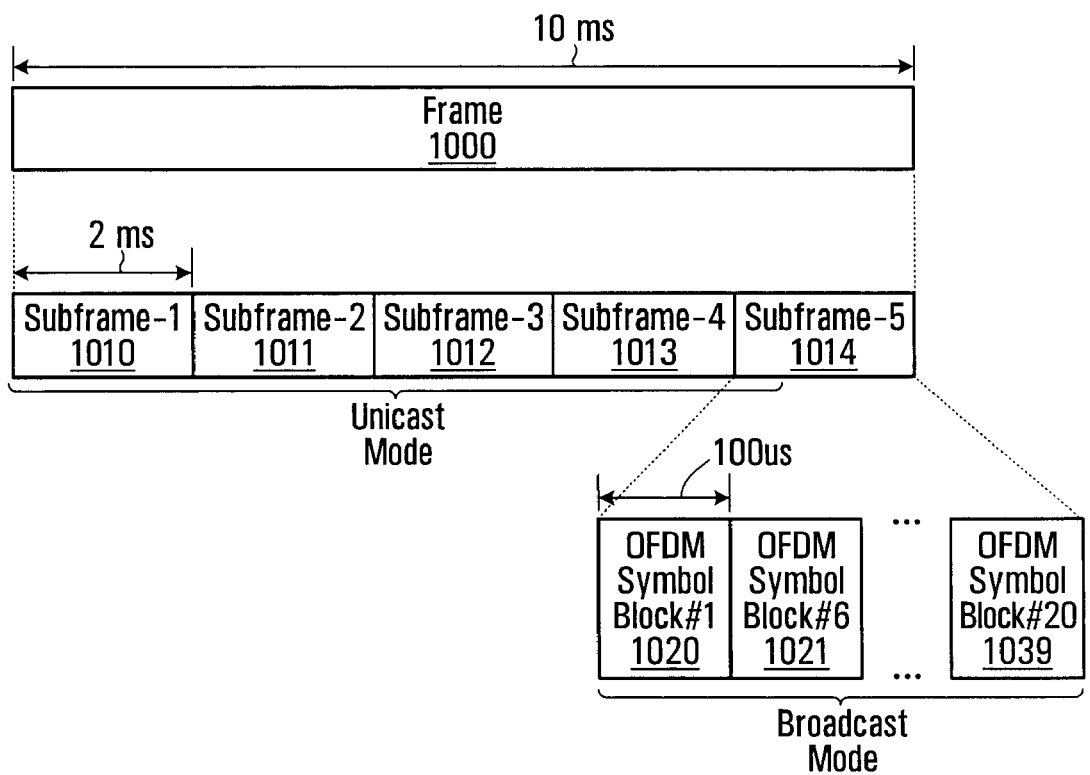
FIG. 10 is a schematic diagram of a particular example of a frame structure for combined unicast mode and broadcast mode transmission of OFDM symbols according to an embodiment of the invention.

In some embodiments, each frame is divided into multiple equal duration subframes, and each subframe is assigned in its entirety to either broadcast mode or unicast mode. In some implementations, an arbitrary assignment within a frame is permitted; in other implementations, the assignment is constrained to result in a single contiguous period for each of broadcast mode and unicast mode. An example of this will now be described with reference to FIG. 10. FIG. 10 is of substantially the same structure as FIG. 9 in that the frame 1000 is divided into five subframes, each having a duration of 2 ms. The partitioning of the frame between unicast mode and broadcast mode portions in FIG. 10 coincides with the boundary between two adjacent subframes, namely subframe 1013 and subframe 1014. Subframe 1014 of the frame 1000 is used for transmission of OFDM symbols in broadcast mode. The previous four subframes 1010,1011,1012,1013 are used for transmission of OFDM symbols in unicast mode, instead of broadcast mode as they were in FIG. 9.

In FIG. 10, the frame 1000 is partitioned in a manner that one subframe 1014 of the frame 1000 is provisioned for broadcast mode transmission and four subframes 1010,1011, 1012,1013 are provisioned for unicast mode transmission. In other implementations the number of subframes that support broadcast mode transmission and the number of subframes that support unicast mode transmission each vary respectively, but the total number of subframes being fixed. More generally, as described above, the total number of subframes in the frame may be greater than or less than five and the sum of the number of subframes in each of the two modes equals the total number of subframes.

In addition, in the example of FIG. 10 a first four subframes 1010,1011,1012,1013 are used for unicast mode transmissions and a last or fifth subframe 1014 is used for broadcast mode transmissions. In some embodiments the unicast mode portion of the frame is located at the end of the frame and the broadcast mode portion of the frame is located at the beginning of the frame. In some embodiments, multiple broadcast mode portions can occur in a frame separated by unicast mode portions or vice versa.

Partitioning Along Slot Boundaries

Figure 11:
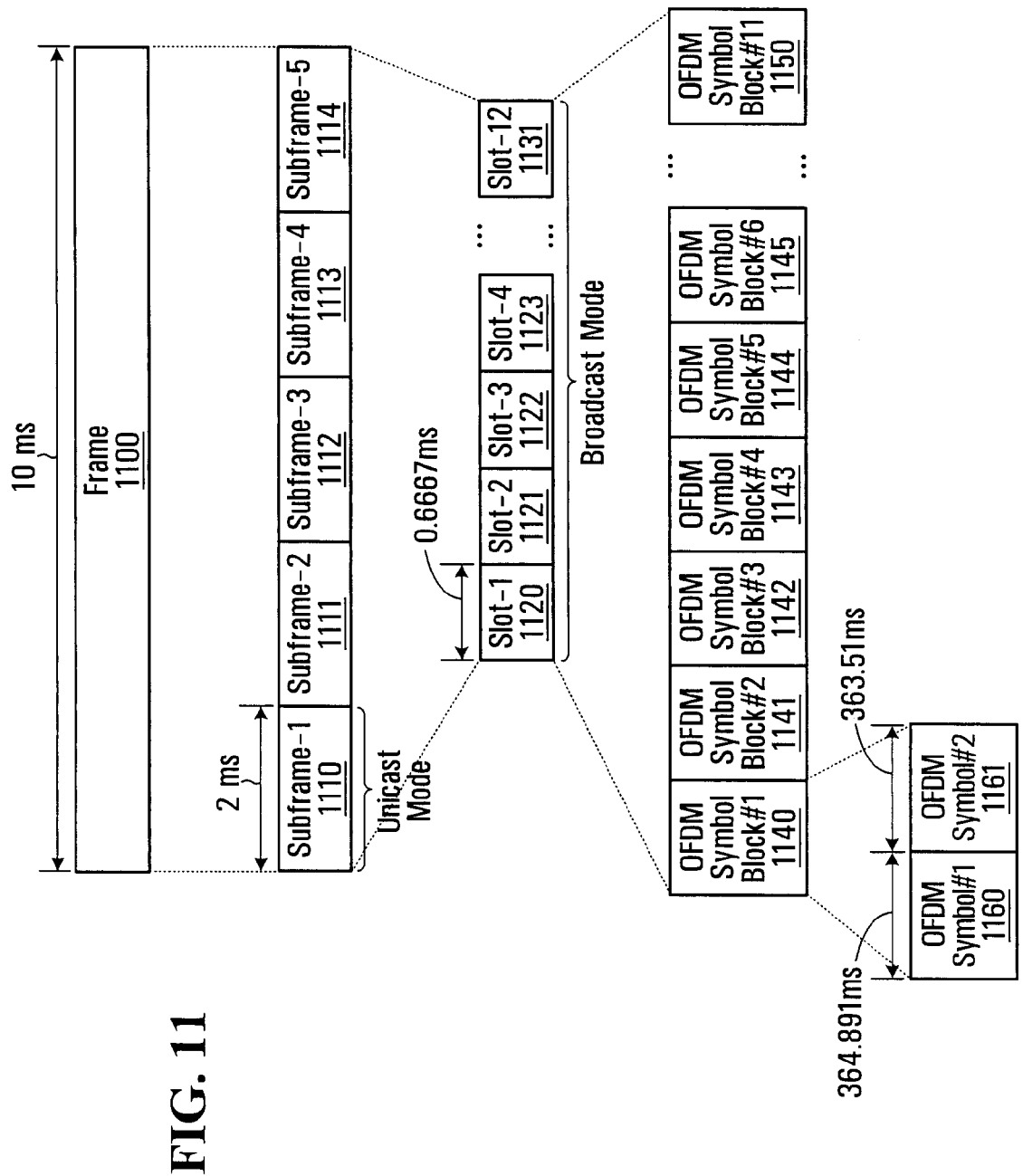
FIG. 11 is a schematic diagram of another particular example of a frame structure for combined unicast mode and broadcast mode transmission of OFDM symbols according to an embodiment of the invention.
Figure 12:
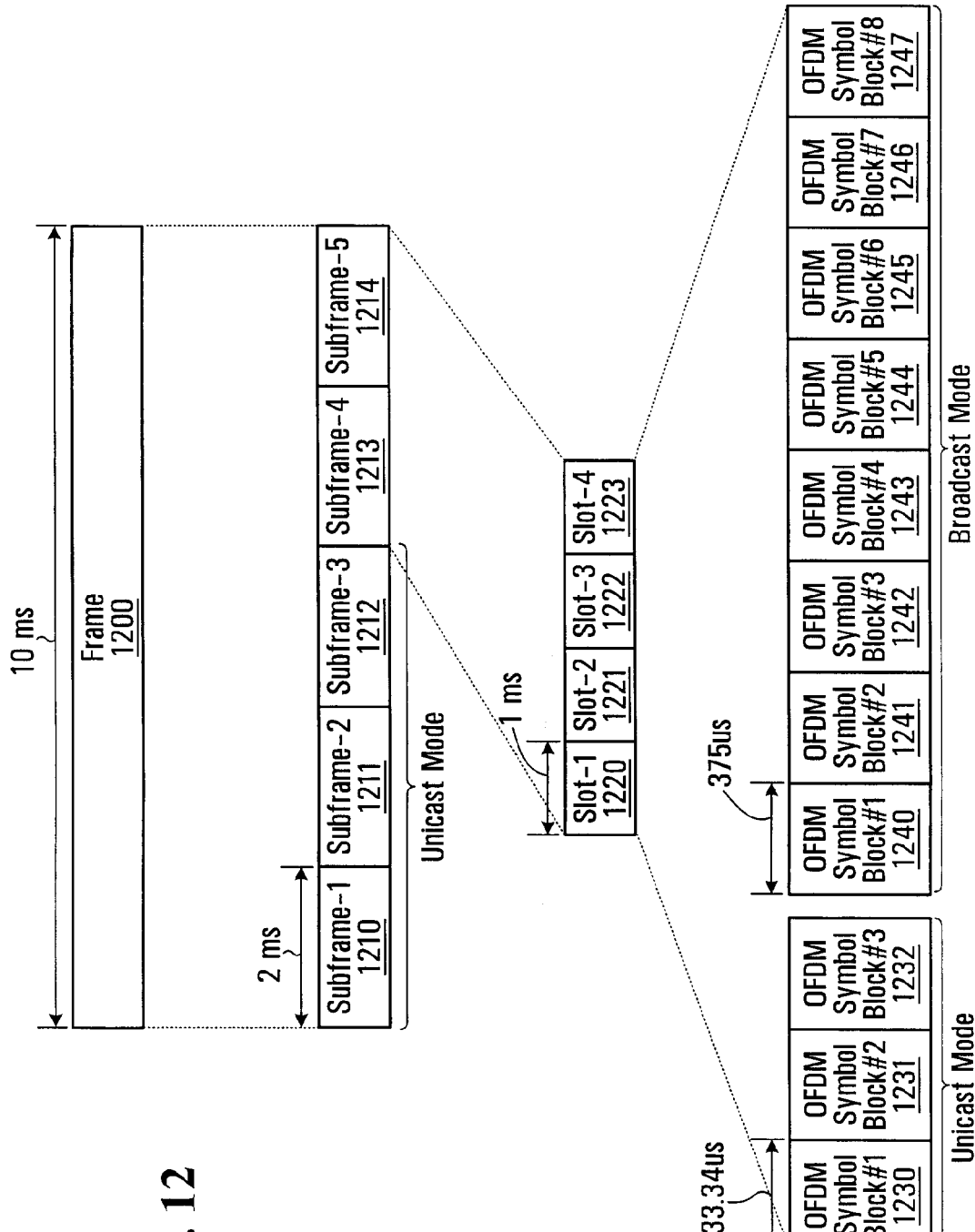
FIG. 12 is a schematic diagram of yet another particular example of a frame structure for combined unicast mode and broadcast mode transmission of OFDM symbols according to an embodiment of the invention.

In some embodiments, a further granularity for partitioning between broadcast mode and unicast mode is provided. Logically, each subframe is subdivided into slots. Then, for a given subframe, a respective time period spanning one or more consecutive slots is defined for each of broadcast mode and unicast mode in which the partitioning occurs at a slot boundary. Then, during the respective period, as many OFDM symbols as possible are transmitted for the given mode. All of the slots of a given subframe can be assigned to one of broadcast mode and unicast mode in which case the slot distinction becomes irrelevant for that subframe. An example of this is shown in FIG. 11, described below. On the other hand, for some subframes, one or more slots are assigned to broadcast mode, and one or more slots are assigned to unicast mode. An example of this is shown in FIG. 12, described below. In some examples of this, the partitioning of the frame into the unicast mode portion and the broadcast mode portion results in a group of OFDM Symbol Blocks for the unicast mode and/or broadcast that do not divide evenly into individual slots, but the group of OFDM Symbol Blocks collectively fits within a group of more than one slots such as shown in the FIG. 12 example described below.

An example of such a frame structure supporting both unicast mode and broadcast mode OFDM symbol transmission is shown in FIG. 11. As in FIG. 10, there are five subframes 1110,1111,1112,1113,1114 in the 10 ms duration frame 1100, in which each subframe has a duration of 2 ms. Each subframe is further defined to include three slots. The partitioning of the frame between unicast mode and broadcast mode portions in FIG. 11 coincides with the boundary between adjacent subframes 1110 and 1111. In the illustrated example, all three slots of a first subframe 1110 in the frame 1100 are configured for unicast mode transmission in a similar manner to the unicast mode subframes in FIG. 10. The twelve slots 1120-1131 collectively contained in the last four subframes 1111,1112,1113,1114 include twelve slots 1120-1131 that are used for broadcast mode transmission and each slot is 0.6667 ms in duration. Having assigned the slots in this manner, the slots for a given mode are combined into a single transmission resource used to transmit as many OFDM symbols (or OFDM symbol blocks) as possible. For the particular example illustrated, the twelve slots 1120-1131 include have enough capacity to contain eleven OFDM broadcast Symbol Blocks 1140-1150. The eleven OFDM Symbol Blocks 1140-1150 each include two OFDM symbols 1160,1161 of different duration. A first OFDM symbol has a duration of 364.891 µs and a second OFDM symbol has a duration of 363.51 µs. Each of the OFDM symbols in the OFDM Symbol Blocks is not limited to having a different duration than other OFDM symbols in each OFDM Symbol Block. In some embodiments each of the OFDM symbols have the same duration.

In the example of FIG. 11, the eleven OFDM Symbol Blocks 1140-1150 in the broadcast mode portion do not divide evenly into the twelve slots 1120-1131, but the broadcast OFDM Symbol Blocks 1140-1150 collectively fit within the entire twelve slots 1120-1131 of the four subframes 1111, 1112,1113,1114. In some embodiments the number of OFDM Symbol Blocks does divide evenly into the number slots so that a particular number of OFDM Symbol Blocks fit within each slot.

FIG. 12 shows an example where the partition between unicast mode and broadcast transmission of OFDM symbols is; defined to occur along a slot boundary within a subframe. A frame 1200 has a duration of 10 ms. There are five subframes 1210,1211,1212,1213,1214 in the frame 1200, each 2 ms in duration. The first three subframes 1210,1211,1212 in the frame 1200 are for unicast mode OFDM symbol transmission. The first three subframes 1210,1211,1212 in the frame 1200 may have a unicast mode structure similar manner to the unicast mode subframes in FIG. 10. The last two subframes 1213,1214 include four slots 1220,1221,1222,1223, in which each slot is 1 ms in duration. The partitioning of the unicast mode portion and broadcast mode portion in FIG. 12 coincides with the boundary between adjacent Slot-1 1220 and Slot-2 1221. Slot-1 1220 includes three OFDM Symbol Blocks 1230,1231,1232 each having a duration of 333.34 µs. The three OFDM Symbol Blocks 1230, 1231,1232 support unicast mode transmission. Each OFDM Symbol Block includes two OFDM symbols (not shown) each having a duration of 166.67 µs. The remaining three slots 1221,1222,1223 include eight OFDM Symbol Blocks 1240-1247 that support broadcast mode transmission. Each of the broadcast mode OFDM Symbol Blocks 1240-1247 has a duration of 375 µs. The eight OFDM Symbol Blocks 1240-1247 each include two OFDM symbols (not shown) each having a duration of 187.5 µs. In some embodiments, the difference in the size of the OFDM symbols in the broadcast mode portion and the unicast mode portion is the difference in the number of samples in the cyclic prefixes of the two modes.

In the example of FIG. 12, the eight OFDM Symbol Blocks 1240-1247 do not divide evenly into the three slots 1221, 1222,1223, but the eight OFDM Symbol Blocks collectively fit within the three slots 1221,1222,1223. In some embodiments the number of OFDM Symbol Blocks does divide evenly into the number slots so that a particular number of OFDM Symbol Blocks fit within each slot.

Partitioning Along OFDM Symbol Boundaries

In some embodiments, the partitioning of the frame into the unicast mode portion and the broadcast mode portion results in a boundary between the two mode portions occurring within a subframe, and furthermore within a slot of the multiple slots within the subframe. Examples of this are shown in FIGS. 13 and 14 and will be described in further detail below.

Figure 13:
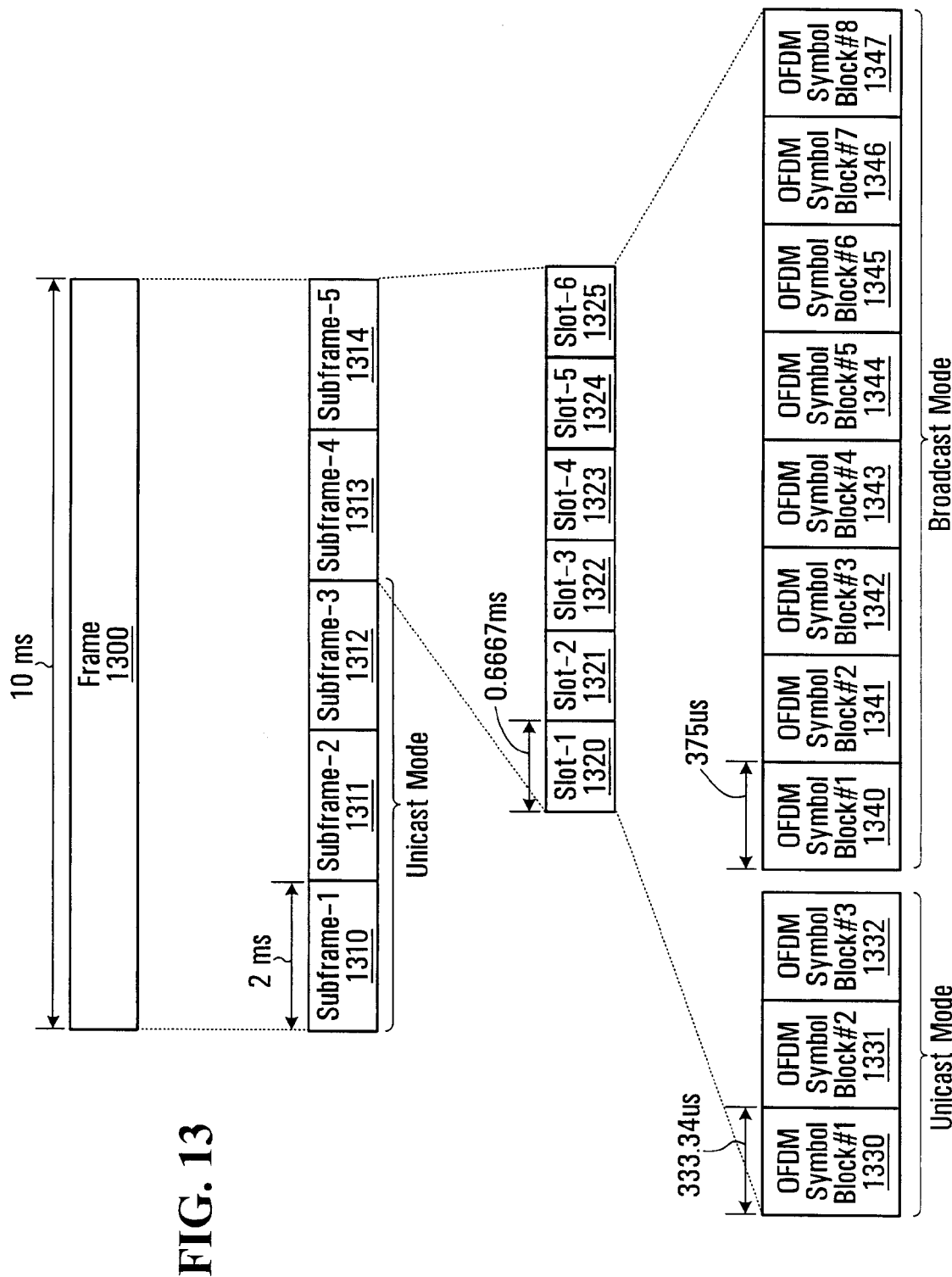
FIG. 13 is a schematic diagram of a further particular example of a frame structure for combined unicast mode and broadcast mode transmission of OFDM symbols according to an embodiment of the invention.

FIG. 13 is similar to FIG. 12 in that there are five subframes 1310,1311,1312,1313,1314 in the 10 ms duration frame 1300. Each of the five subframes has a duration of 2 ms each containing three slots. The first three subframes 1310,1311, 1312 in the frame 1300 are configured for unicast mode traffic. The last two subframes 1313,1314 include a total of six slots 1320-1325, in which each slot has a duration equal to 0.6667 ms for a total duration of 4 ms. The 4 ms period is then partitioned into a unicast mode portion and a broadcast mode portion at a point in the 4 ms period that does not coincide with a slot boundary. Specifically, the six slots 1320-1325 include a total of eleven OFDM Symbol Blocks 1330,1331, 1332,1340-1347 including two OFDM symbols each (not shown). The first three OFDM Symbol Blocks 1330,1331, 1332 support unicast mode transmission with each OFDM Symbol Block having a duration of 333.34 µs. The remaining eight OFDM Symbol Blocks 1340-1347 support broadcast mode transmission with each OFDM Symbol Block having a duration of 375 µs.

In the example of FIG. 13, the eleven OFDM Symbol Blocks 1330-1332,1340-1347 do not divide evenly into the six slots 1320-1325, but the eleven OFDM Symbol Blocks 1330-1332,1340-1347 collectively fit within the entire six slots 1320-1325 of the two subframes 1313,1314. In some embodiments the number of OFDM Symbol Blocks of the unicast mode and/or the broadcast mode each respectively divide evenly into individual slots so that a particular number of OFDM Symbol Blocks corresponds to each slot such as was the case with the examples of FIGS. 11 and 12 by way of example.

Figure 14:
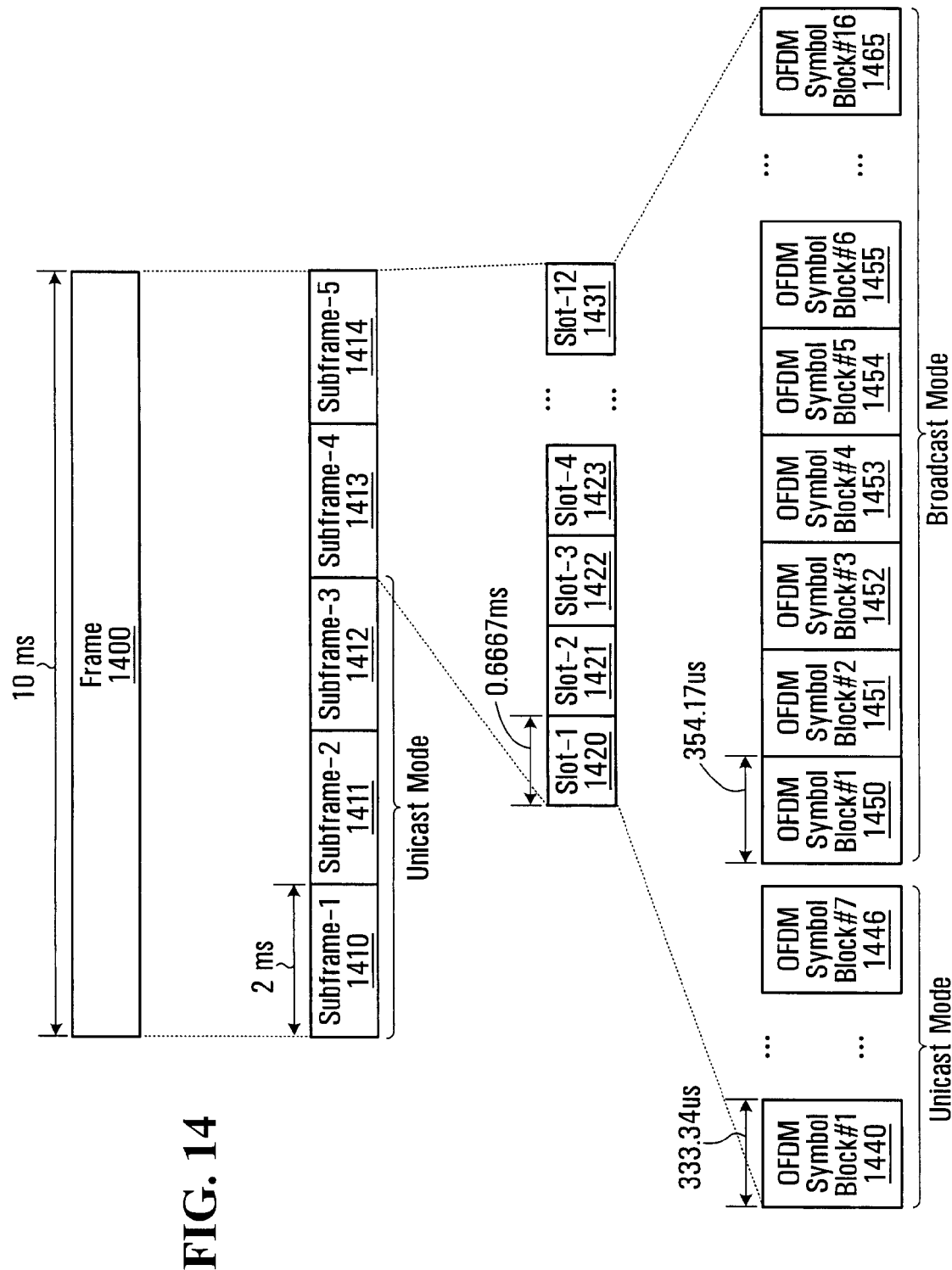
FIG. 14 is a schematic diagram of yet a further particular example of a frame structure for combined unicast mode and broadcast mode transmission of OFDM symbols according to an embodiment of the invention.

Another example of a frame structure supporting both unicast transmission mode and broadcast transmission mode is shown in FIG. 14. A first subframe 1410 in a frame 1400 is for unicast mode transmission. The first subframe 1410 may have a unicast mode structure similar to the subframe unicast mode structure in FIG. 10. A last four subframes 1411,1412,1413, 1414 include a total of twelve slots 1420-1431, in which each slot is 0.6667 ms in duration. The partitioning of the unicast mode portion and broadcast mode portion in FIG. 14 occurs at the level of granularity of the OFDM Symbol Block within a slot of one of the subframes of the frame. The twelve slots 1420-1431 include a total of twenty-three OFDM Symbol Blocks 1440-1446,1450-1465. The first seven OFDM Symbol Blocks 1440-1446 support unicast mode transmission with each OFDM Symbol Block having a duration of 333.34 µs. The remaining sixteen OFDM Symbol Blocks 1450-1465 support broadcast mode transmission with each OFDM Symbol Block having a duration of 354.17 µs. Each OFDM Symbol Block includes two OFDM symbols (not shown).

In the example of FIG. 14, the twenty-three OFDM Symbol Blocks 1410-1446,1450-1465 do not divide evenly into the twelve slots 1420-1431, but the twenty-three OFDM Symbol Blocks 1410-1446,1450-1465 collectively fit within the entire twelve slots 1420-1431 of the four subframes 1411, 1412,1413,1414. In some embodiments the number of OFDM Symbol Blocks of the unicast mode and/or the broadcast mode each respectively evenly divide into individual slots so that a particular number of OFDM Symbol Blocks corresponds to each slot.

The partitioning between unicast mode and broadcast mode is shown to occur at the OFDM Symbol Block, but in some embodiments the partitioning occurs along an OFDM symbol boundary.

In some embodiments, when partitioning occurs at a slot, OFDM Symbol Block or OFDM symbol boundary within one of the subframes, the partitioning between unicast mode and broadcast mode is defined at that boundary and each remaining subframe is used in its entirety for one of unicast mode or broadcast more.

In OFDM systems, instead of using a single carrier frequency to transmit a signal, the signal is distributed over multiple orthogonal carrier frequencies also known as sub-carriers. Sub-carriers are any one of data sub-carriers for data transmission, pilot sub-carriers for synchronization, or sub-carriers that do not involve direct transmission, but are used as transition guards between parts of the frame. Multiple sub-carriers can be grouped together as a logical sub-channel. There are many different ways of grouping sub-carriers into channels such as using sub-carriers that are distributed within the sub-carrier band for diversity channels and using adjacent sub-carriers for sub-band channels. In some OFDM systems, OFDM symbols are transmitted using multiple logical sub-channels. The sub-channels in the OFDM symbols can be used for different purposes, for example transmitting payload data, transmitting pilots, transmitting channel estimation information, or transmitting control information for DL and UL transmissions.

In some implementations OFDM symbols transmitted by unicast and/or broadcast modes are transmitted by different sub-channels in the same slot.

In some embodiments a first OFDM symbol in a frame includes a preamble pertaining to both the unicast mode and the broadcast mode. In other embodiments, a first several of the OFDM symbols collectively include a preamble pertaining to both the unicast mode and the broadcast mode. In some embodiments each broadcast and unicast transmission mode portion has its own respective preamble. Pilot channels, DL control channels and DL traffic channels may be carried by the remaining OFDM symbols of the frame.

In some embodiments the preamble of the frame includes a channel for providing training information for synchronization.

In some embodiments there is a channel to transmit various transmitter related information to the mobile terminals within range of the BS. In some embodiments this channel is referred to as a broadcast control channel (BCC). In some implementations the BCC may be located within OFDM symbols that form the preamble. In other implementations the BCC is located in OFDM symbols that are not part of the preamble, but are located elsewhere within the frame structure. Examples of transmitted information may include, but are not limited to: system bandwidth identification, cell/sector ID; antenna configuration of the BS; and transmission mode partitioning information. In some embodiments the BCC is used only periodically to transmit information to the mobile terminals. For example, the BCC may be included in every frame or included once in every multiple of a particular number of frames.

In some embodiments the preamble also includes information used by the mobile terminal to determine a location of a broadcast control channel (BCC) elsewhere in the preamble.

After the mobile terminal has accessed the network, the mobile terminal determines the location of the BCC from information in the preamble. From the BCC information, the mobile terminal then obtains, along with other information, the information specific to transmission mode partitioning of frames that is used by a transmitter in a cell or a sub-network in which the mobile terminal is currently located.

In some embodiments, the partitioning of the frame results in a nominal frame structure that includes both the unicast mode portion and the broadcast mode portion. In some embodiments, the broadcast mode portion is used for unicast mode transmission, but the overall length of the broadcast mode is maintained, that is the longer guard time is maintained as if the symbol were a broadcast OFDM symbol. For example, when there are no broadcast mode OFDM symbols to send, the broadcast mode portion can be used to send unicast mode OFDM symbols. In some embodiments, the signalling channel and pilot channel for unicast mode can be transmitted in the broadcast mode portion. However, portions of the frame provisioned for unicast mode transmissions cannot be used for multi-cell broadcast mode transmissions as the duration of broadcast mode OFDM symbols is longer than the duration of the unicast mode OFDM symbols due to the respective sizes of the cyclic prefixes, or more generally guard times of the two modes. In multi-cell broadcast mode OFDM symbols have too long of a duration to fit within the unicast mode OFDM symbol durations without lengthening the frame. If the cyclic prefix is shortened, ISI will not be mitigated as effectively between consecutive OFDM symbols. In some embodiments, portions of the frame provisioned for unicast mode transmissions can be used for single-cell broadcast transmission as there is no propagation delay to be concerned within single-cell broadcast.

In some embodiments a variety of frame structures with different frame partitioning are available for transmitting OFDM symbols using broadcast mode and/or unicast mode. Each frame structure has a particular identifier for identifying a selected frame structure. For example, the frame structure identifier may be one of a plurality of binary numbers of a predetermined number of bits assigned to the respective frame structure. In some embodiments the transmission mode provisioning information on the BCC may take the form of the frame structure identifier.

More generally a method for receiving a frame comprising a plurality of OFDM symbols includes: accessing a communication network sending the frame; identifying system parameters including a transmission mode identifier from information in at least one OFDM symbol of a received frame; and receiving OFDM symbols subsequent to the first OFDM symbol according to a frame structure associated with the transmission mode identifier. The transmission mode identifier indicates a location of a boundary in the frame between OFDM symbols transmitted in a unicast mode and OFDM symbols transmitted in a broadcast mode.

Figure 15:
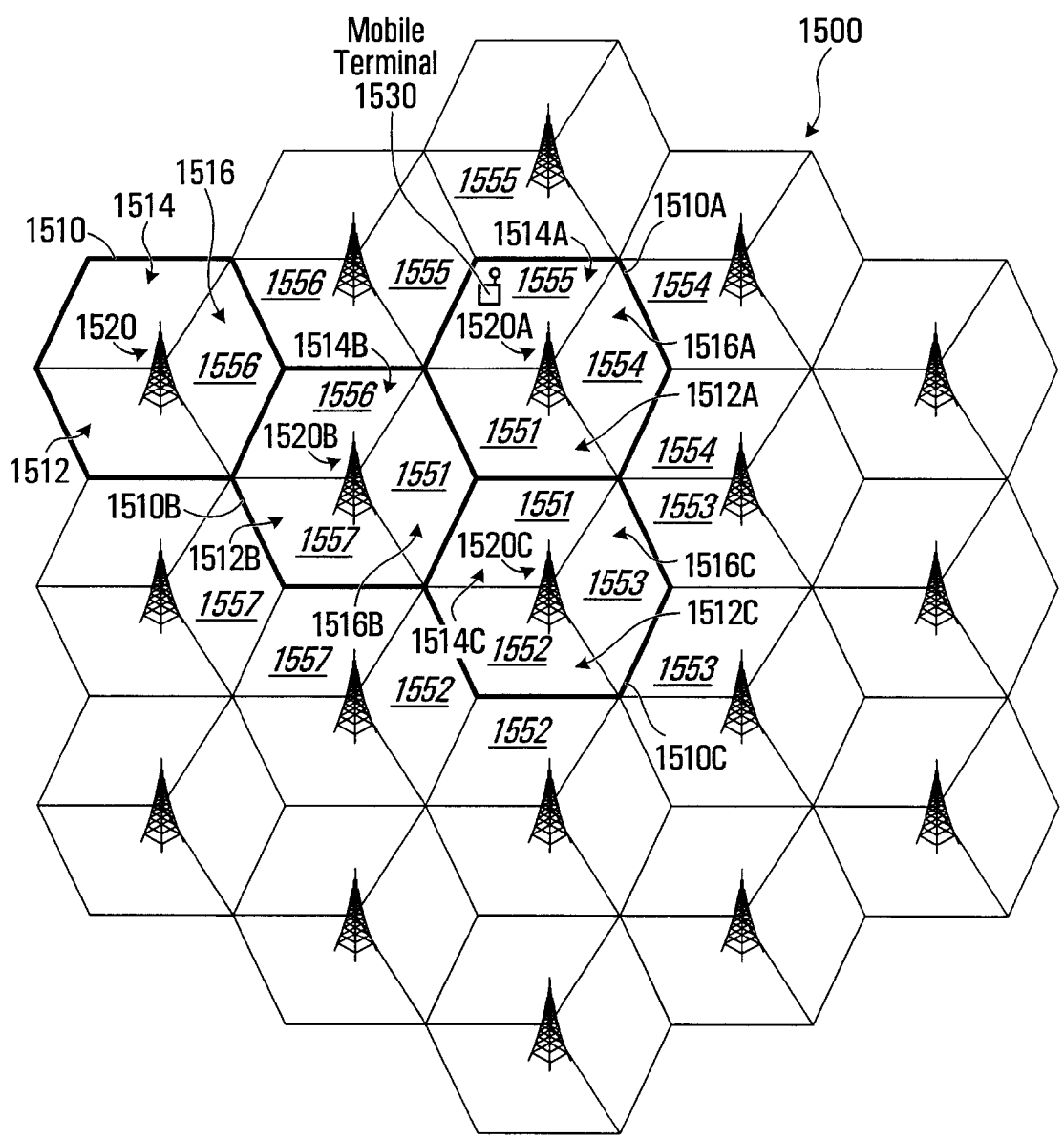
FIG. 15 is a schematic diagram of a cellular communication system according to an embodiment of the invention.

An example communication network is described above with respect to FIG. 1. FIG. 15 shows another example of a communication network, generally indicated at 1500 according to an embodiment of the invention. Multiple adjacent telecommunication cells 1510 are used to cover a geographical area. Each cell 1510 is represented by a hexagonal shape with a transmitter 1520 such as a BS located substantially at the center of the cell 1510. The transmitter can support single-cell unicast mode transmissions, single-cell broadcast mode transmissions and multi-cell broadcast transmissions. Each cell 1510 is also divided radially from the central position of the BS 1520 in the cell 1510 into three substantially equal portions 1512,1514,1516.

A mobile terminal 1530 is located in a first cell 1510A. Cell 1510A is divided into three substantially equal portions 1512A,1514A,1516A. Adjacent cells border on each external cell edge of portion 1512A. A portion 1516B of a second cell 1510B borders portion 1512A of the first cell 1510A and a portion 1514C of a third cell 1510C borders 1512A of the first cell 1510A. The three bordering portions 1512A,1516B, 1514C of cells 1510A,1510B,1510C, respectively, form a first sub-network 1551 within the overall communication network of the collective group of cells. A sub-network is a plurality of synchronized ESs that form a network, which uses less than the total number of BSs in the entire communication network. In some embodiments different sub-networks are used for transmitting different content. Additional sub-networks 1552,1553,1554,1555,1556,1557 are also shown in FIG. 15 formed from portions of cells in the communications network 1500.

In some embodiments the mobile terminal 1530 receives unicast mode transmissions from BS 1520A when within clear reception of BS 1520A. When the mobile terminal 1530 is close at the edge of cell 1510A, the mobile terminal 1530 may receive unicast mode transmissions from either BS 1520B or 1520C depending on whether the mobile terminal 1530 has better reception from either of the BSs 1520B, 1520C than from BS 1520A.

In some embodiments the mobile terminal 1530 receives broadcast mode transmissions from all BSs broadcasting in the sub-network in which the mobile terminal 1530 is located. In the example of FIG. 15 the number of BSs in the first sub-network is three: BS 1520A; BS 1520B; and BS 1520C. Due to the multiple paths that transmissions from each of the BSs can travel in reaching the mobile terminal 1530, the cyclic prefix for broadcast mode transmissions is longer than for unicast mode transmissions.

Sub-networks are shown in FIG. 15 to be formed from a single portion of three adjacent cells, but it is to be understood that a sub-network could be larger, for example formed from a collection of multiple adjacent cells and portions of cells adjacent to and bordering the edges of the collection of the multiple adjacent cells. In some embodiments the larger the sub-network the longer the cyclic prefix for OFDM symbols transmitted when using the broadcast mode.

Furthermore, while the cells 1510 are shown to be divided into three substantially equal portions, it is to be understood that the cells may be divided into more or less than three portions and the portions may not be substantially equal in size. In some embodiments the number and size of the portions the cells are divided into is dependent upon antennas of the BSs used for transmitting OFDM symbols in these portions. More generally, the number and size of the portions the cell are implementation specific parameters.

The cells 1510 in FIG. 15 are also shown to be all the same size. In some embodiments the cells vary in size.

In some implementations the frame structure used for all transmitters transmitting in a particular sub-network is the same for each respective frame transmitted at the same time by all the transmitters.

In some implementations transmission of each frame by each of the transmitters of the respective sub-networks is synchronized to occur simultaneously.

In some embodiments multiple sub-networks are synchronized to broadcast the same transmissions within each of the sub-networks, as opposed to a single larger network transmitting the same transmission from each BS in the larger network. By using the synchronized multiple sub-networks the duration of the cyclic prefix can be minimized as compared to that of the single larger network. In each sub-network of the multiple sub-networks the ratio of broadcast mode OFDM symbols to unicast mode OFDM symbols is maintained for each frame transmitted by each BS in the sub-network. In some embodiments multiple sub-networks transmitting the same content mitigate interference from propagation or multipath delay of the same content transmitted by adjacent sub-networks by using different scrambling codes and different sub-channel arrangements for transmission. In some implementations technologies such as interference cancellation and/or soft combining can be used to improve the reception of mobile terminals at the edge of the sub-networks.

In some embodiments, hand-off is performed when leaving one sub-network and entering another sub-network. In some embodiments, soft-combining of received signals is performed at a boundary between sub-networks.

In some embodiments, sub-network identifiers are used to identify which BSs are included in a particular sub-network.

In some embodiments of the present invention systems and methods are provided for MIMO-OFDM communications including broadcast and unicast mode co-existence to maintain the same sampling frequency and same FFT size.

In some embodiments of the present invention systems and methods are provided for transformed OFDM (T-OFDM) communications including broadcast and unicast mode co-existence to maintain the same sampling frequency and same FFT size. T-OFDM is described in further detail in PCT Patent Application No. filed Mar. 30, 2006, which is assigned to the same assignee of the present application and hereby incorporated in its entirety.

In some embodiments of the present invention systems and methods are provided for MIMO-OFDM and/or T-OFDM communications including an frequency division duplex (FDD) frame structure which supports the existing UMTS TTI. In some embodiments a frame structure is provided that supports time division duplexing (TDD)

In some embodiments of the present invention systems and methods are provided for MIMO-OFDM communications where a sampling frequency can be obtained from UMTS chip rate.

In some embodiments of the present invention systems and methods are provided for MIMO-OFDM communications which support uniform transmission from all BSs.

In some embodiments of the present invention systems and methods are provided for MIMO-OFDM communications including larger (when compared to unicast mode) guard interval to tolerate longer multi-path delay.

In some embodiments of the present invention systems and methods are provided for MIMO-OFDM communications that can switch between broadcast mode and unicast mode.

In some embodiments of the present invention systems and methods are provided for MIMO-OFDM communications where transmitters may be group based broadcast mode without the requirement for the longer prefix and/or denser pilots. According to an embodiment of the invention the transmitter is a base station.

In some embodiments of the present invention systems and methods are provided for MIMO-OFDM communications which support a flexible slot definition.

In some embodiments of the present invention there is provided an OFDM sub-carrier arrangement for an improved broadcast mode.

Figure 1:
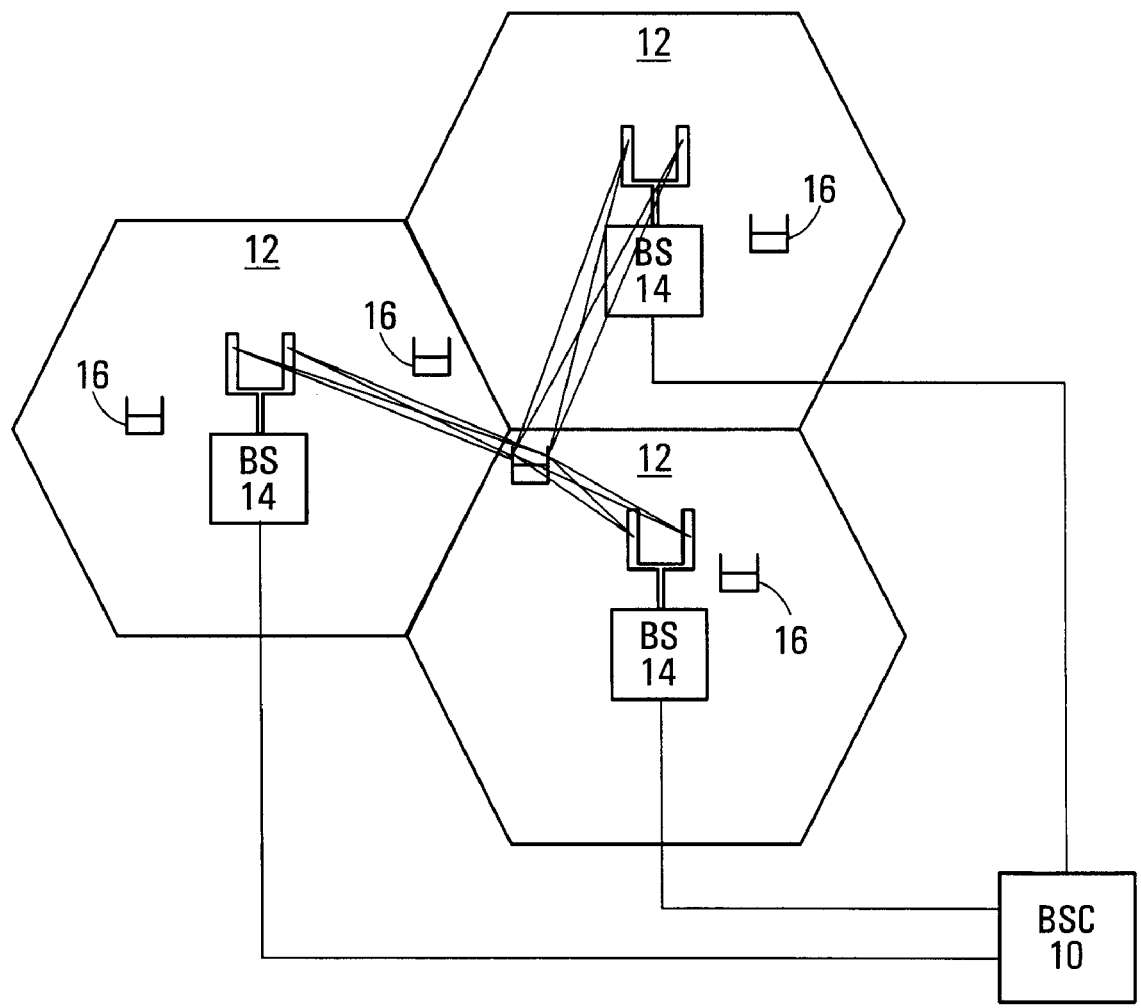
FIG. 1 is a block diagram of a cellular communication system.

For the purposes of providing context for embodiments of the invention for use in a communication system, FIG. 1 shows a base station controller (BSC) 10 which controls wireless communications within multiple cells 12, which cells are served by corresponding base stations (BS) 14. In general, each base station 14 facilitates communications using OFDM with mobile and/or wireless terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications.

Figure 2:
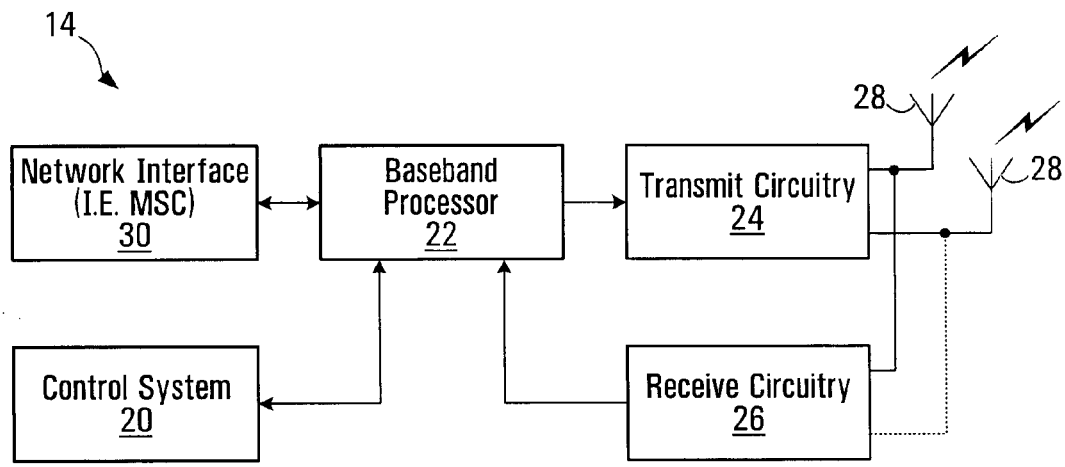
FIG. 2 is a block diagram of an example base station that might be used to implement some embodiments of the present invention.

A high level overview of the mobile terminals 16 and base stations 14 upon which aspects of the present invention may be implemented is provided prior to delving into the structural and functional details of the preferred embodiments. With reference to FIG. 2, a base station 14 is illustrated. The base station 14 generally includes a control system 20, a baseband processor 22, transmit circuitry 24, receive circuitry 2E, multiple antennas 28, and a network interface 30. The receive circuitry 26 receives radio frequency signals bearing information from one or more remote transmitters provided by mobile terminals 16 (illustrated in FIG. 1). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). Various modulation and processing techniques available to those skilled in the art are used for signal transmission between the base station and the mobile terminal.

Figure 3:
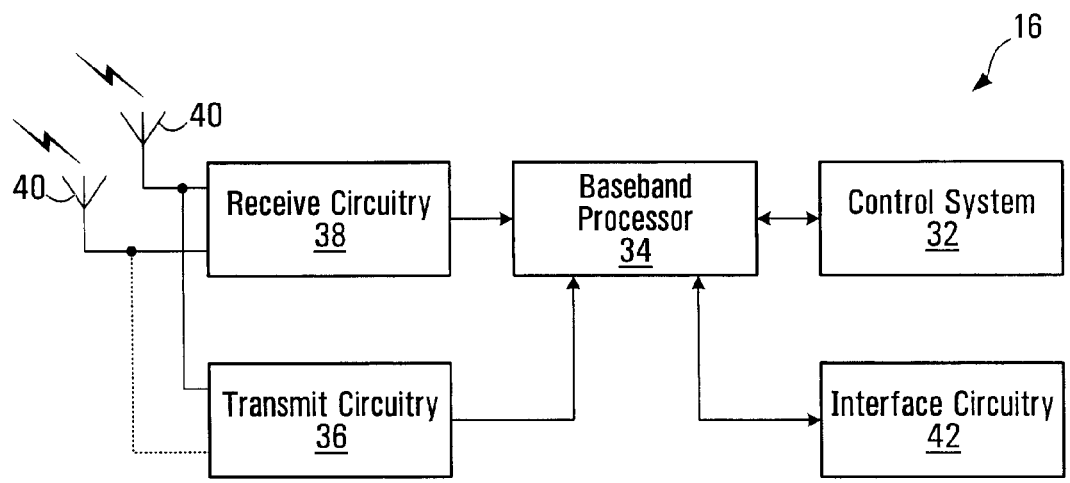
FIG. 3 is a block diagram of an example wireless terminal that might be used to implement some embodiments of the present invention.

With reference to FIG. 3, a mobile terminal 16 configured according to one embodiment of the present invention is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are used for signal transmission between the mobile terminal and the base station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28, and each mobile terminal 16 is equipped with "m" receive antennas 40. Notably, the respective antennas can be used for reception and transmission using appropriate duplexers or switches and are so labeled only for clarity.

Figure 4:
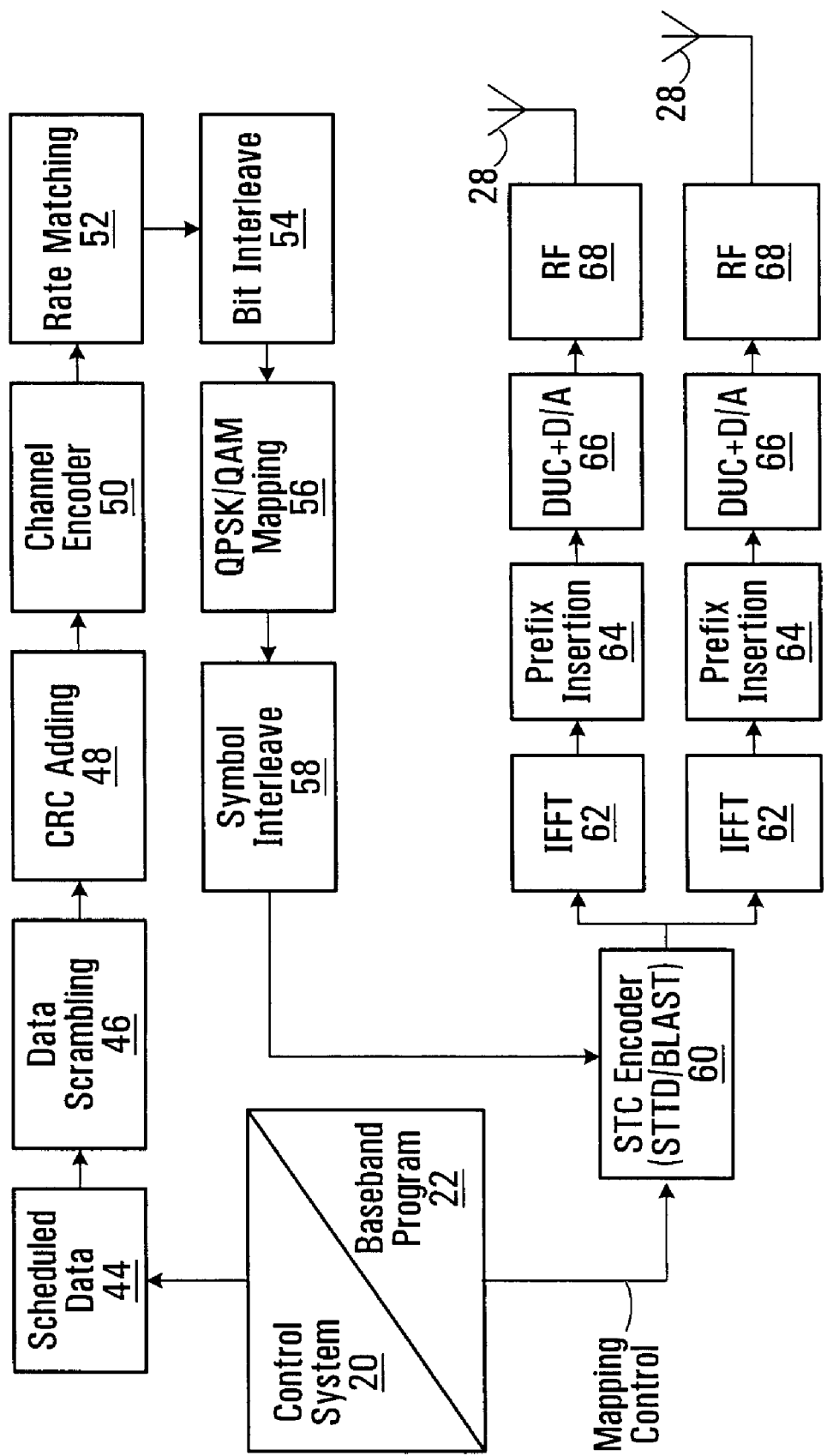
FIG. 4 is a block diagram of a logical breakdown of an example OFDM transmitter architecture that might be used to implement some embodiments of the present invention.

With reference to FIG. 4, a logical OFDM transmission architecture will be described. Initially, the base station controller 10 will send data to be transmitted to various mobile terminals 16 to the base station 14. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 2 will provide a mapping control signal to control STC encoding. At this point, assume the symbols for the "In" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 5:
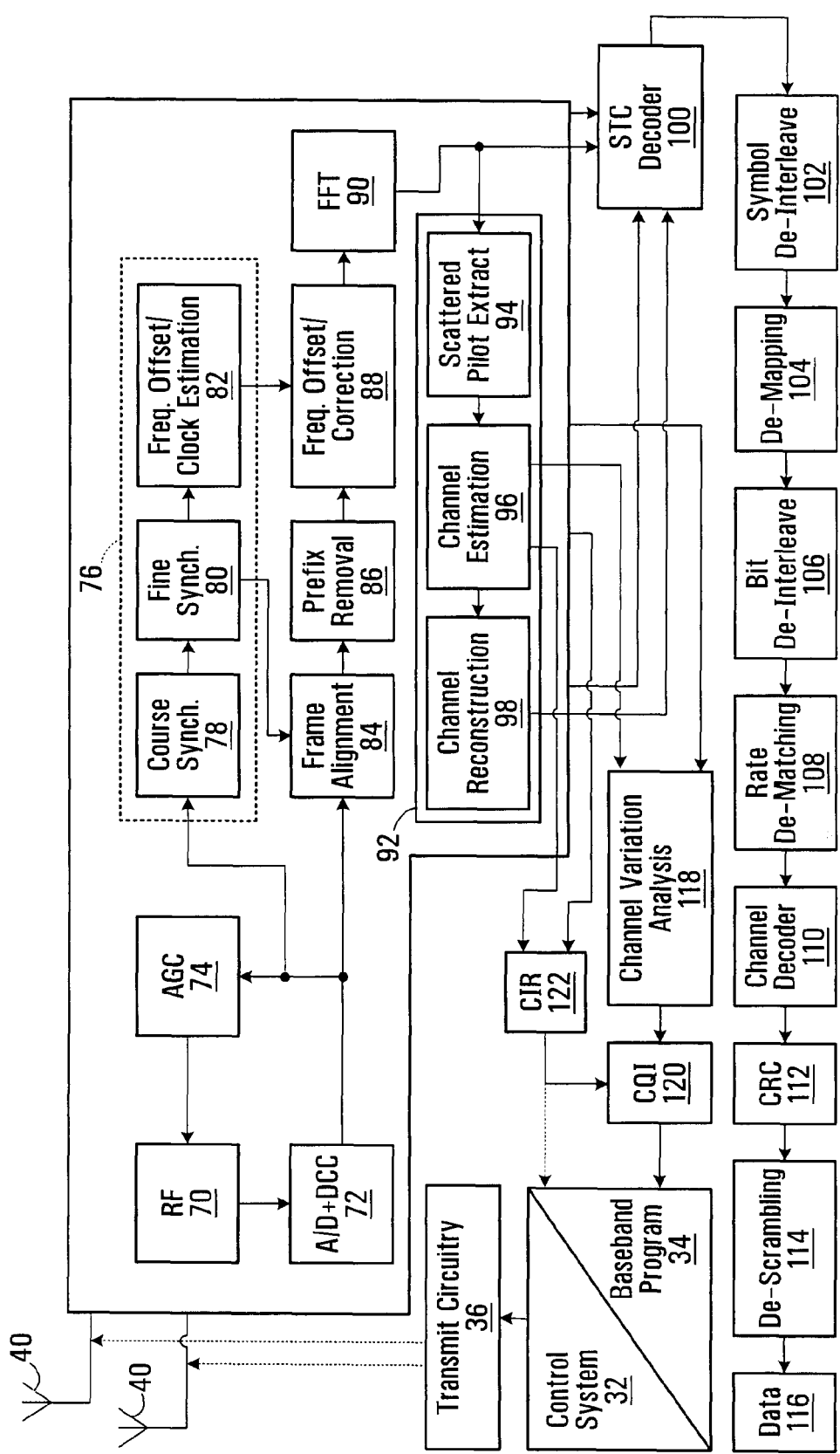
FIG. 5 is a block diagram of a logical breakdown of an example OFDM receiver architecture that might be used to implement some embodiments of the present invention.

Reference is now made to FIG. 5 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Examples of scattering of pilot symbols among available sub-carriers over a given time and frequency plot in an OFDM environment are found in PCT Patent Application No. PCT/CA2005/000387 filed Mar. 15, 2005 assigned to the same assignee of the present application. Continuing with FIG. 5, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. The channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

FIGS. 1 to 5 each provide a specific example of a communication system or elements of a communication system that could be used to implement embodiments of the invention. It is to be understood that embodiments of the invention can be implemented with communications systems having architectures that are different than the specific example, but that operate in a manner consistent with the implementation of the embodiments as described herein.

Numerous modifications and variations of the present invention are possible in light of the above teachings. It is therefore to be understood that within the scope of the appended claims, the invention may be practised otherwise than as specifically described herein.

The invention claimed is:

1. A method for use in a transmitter of a telecommunication network comprising:
   the transmitter arranging in a frame a plurality of OFDM symbols to support OFDM symbol transmission from the transmitter in a unicast mode portion of the frame and a broadcast mode portion of the frame;
   the transmitter transmitting the frame in a sequence of frames in which each frame has a same frame duration,
   wherein the transmitter arranging in a frame a plurality of OFDM symbols comprises the transmitter employing a common sampling frequency and a common FFT size for OFDM symbols transmitted using both unicast mode and broadcast mode.

2. The method of claim 1 further comprising synchronizing transmission by at least two of a plurality of transmitters for each frame in the sequence of frames such that the at least two transmitters partition between unicast mode and broadcast mode synchronously.

3. The method of claim 1 wherein arranging OFDM symbols in the frame comprises:
   dividing the frame into a plurality of equal duration portions; and
   partitioning the frame into the unicast mode portion and the broadcast mode portion to coincide with a boundary that divides the frame into the plurality of equal duration portions.

4. The method of claim 3 wherein dividing the frame into a plurality of equal duration portions comprises dividing the frame into five equal duration portions.

5. The method of claim 1 wherein OFDM symbols in the broadcast mode portion of the frame comprise a longer guard interval than OFDM symbols in the unicast mode portion.

6. The method of claim 1 further comprising defining a plurality of frame structures each including a particular unicast mode portion and broadcast mode portion, and transmitting a frame structure identifier that identifies which frame structure is being used.

7. The method of claim 1 wherein the sequence of frames further comprises at least one of:
   frames that are for unicast mode transmissions only; and
   frames that are for broadcast mode transmissions only.

8. The method of claim 1 further comprising:
   the transmitter dividing each frame into a plurality of subframes;
   the transmitter logically subdividing each subframe into a plurality of slots;
   the transmitter partitioning each frame between unicast mode and broadcast mode along a slot boundary.

9. A method for use in a transmitter of a telecommunication network comprising:
   the transmitter arranging in a frame a plurality of OFDM symbols to support OFDM symbol transmission from the transmitter in a unicast mode portion of the frame and a broadcast mode portion of the frame;
   the transmitter transmitting the frame in a sequence of frames in which each frame has a same frame duration,
   the method further comprising:
   the transmitter using the broadcast mode portion of the frame for transmitting unicast mode OFDM symbols, wherein a duration of the broadcast mode portion is maintained as if broadcast mode OFDM symbols were being transmitted.

10. A method for use in a transmitter of a telecommunication network comprising:
    the transmitter arranging in a frame a plurality of OFDM symbols to support OFDM symbol transmission from the transmitter in a unicast mode portion of the frame and a broadcast mode portion of the frame;
    the transmitter transmitting the frame in a sequence of frames in which each frame has a same frame duration,
    the method further comprising:
    for broadcast mode in a single cell, the transmitter using the unicast mode portion of the frame for transmitting broadcast mode OFDM symbols, wherein a duration of the unicast mode portion is maintained as if unicast mode OFDM symbols were being transmitted.

11. A method for use in a transmitter of a telecommunication network comprising:
    the transmitter arranging in a frame a plurality of OFDM symbols to support OFDM symbol transmission from the transmitter in a unicast mode portion of the frame and a broadcast mode portion of the frame;
    the transmitter transmitting the frame in a sequence of frames in which each frame has a same frame duration,
    the method further comprising:
    the transmitter dividing each frame into a plurality of subframes;
    the transmitter logically subdividing each subframe into a plurality of slots;
    within a subset of subframes of the plurality of subframes, the transmitter partitioning between unicast mode and broadcast mode along an OFDM symbol boundary, and using each remaining subframe in its entirety for one of unicast mode or broadcast more.

12. A method for receiving a frame comprising a plurality of OFDM symbols in a receiver of a telecommunication network, the method comprising:
  the receiver accessing a communication network sending the frame;
  the receiver receiving information from which a frame structure is determined;
  the receiver receiving a plurality of OFDM symbols according to the frame structure,
  wherein the frame structure comprises a unicast mode portion and a broadcast mode portion,
  wherein the plurality of OFDM symbols comprises a common sampling frequency and a common FFT size for OFDM symbols received using both the unicast mode and the broadcast mode.

13. The method of claim 12 wherein the receiver receiving information comprises the receiver determining a location of a broadcast control channel within the plurality of OFDM symbols and extracting from the broadcast control channel information from which the frame structure is determined.

14. A communication network comprising:
  a plurality of telecommunication cells each comprising at least one transmitter and divided into at least two portions;
  at least one sub-network comprised of portions of at least two adjacent telecommunication cells of the plurality of telecommunication cells, the at least one sub-network being supported by one of: a transmitter of one of the at least two adjacent telecommunication cells for unicast mode transmissions, a transmitter of one of the at least two adjacent telecommunication cells for single-cell broadcast mode transmissions and transmitters of all of the at least two adjacent telecommunication cells for broadcast transmissions,
  wherein the transmitters of the at least one sub-network are configured to transmit OFDM symbols in both unicast mode and broadcast mode in a same transmission frame structure,
  wherein the frame structure used for all transmitters transmitting in a particular sub-network is the same for each respective frame transmitted at the same time by all the transmitters.

15. The communication network according to claim 14 wherein when there is more than one sub-network, at least one of the sub-networks transmitting different content than the other sub-networks.

16. The communication network according to claim 14 wherein when there is more than one sub-network, the sub-networks transmitting the same content.

17. The communication network according to claim 14 wherein each sub-network mitigates interference from propagation delay of the same content transmitted by adjacent sub-networks by using at least one of: different scrambling codes and different sub-channel arrangements for transmission.

18. The communication network according to claim 14 wherein transmission of each frame by each of the transmitters of the at least one sub-network is synchronized to occur simultaneously.

* * * * *

UNITED STATES PATENT AND TRADEMARK OFFICE
CERTIFICATE OF CORRECTION

| | | |
|---|---|---|
| PATENT NO. | : 7,813,261 B2 | |
| APPLICATION NO. | : 11/887115 | |
| DATED | : October 12, 2010 | |
| INVENTOR(S) | : Jianglei Ma et al. | |

It is certified that error appears in the above-identified patent and that said Letters Patent is hereby corrected as shown below:

Column 20, line 67, "... unicast mode or broadcast more." should read --... unicast mode or broadcast mode.--.

Signed and Sealed this

Eighteenth Day of January, 2011

David J. Kappos
*Director of the United States Patent and Trademark Office*